US010565635B2

(12) United States Patent
Forss

(10) Patent No.: US 10,565,635 B2
(45) Date of Patent: Feb. 18, 2020

(54) ITEM RECOGNITION AND INTERACTION

(71) Applicant: PayPal, Inc., San Jose, CA (US)

(72) Inventor: Alexander Forss, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 849 days.

(21) Appl. No.: 15/072,226

(22) Filed: Mar. 16, 2016

(65) Prior Publication Data
US 2017/0270582 A1 Sep. 21, 2017

(51) Int. Cl.
G06Q 30/00 (2012.01)
G06F 17/30 (2006.01)
G06Q 30/06 (2012.01)
G06K 9/00 (2006.01)
G06K 9/62 (2006.01)
G06N 20/00 (2019.01)
G06F 16/78 (2019.01)
G06F 16/9535 (2019.01)
G06N 5/00 (2006.01)
G06N 3/08 (2006.01)

(52) U.S. Cl.
CPC ..... G06Q 30/0623 (2013.01); G06F 16/7867 (2019.01); G06F 16/9535 (2019.01); G06K 9/00671 (2013.01); G06K 9/6262 (2013.01); G06K 9/6273 (2013.01); G06N 3/084 (2013.01); G06N 5/003 (2013.01); G06N 20/00 (2019.01)

(58) Field of Classification Search
CPC .................................................. G06Q 30/0623
See application file for complete search history.

(56) References Cited

U.S. PATENT DOCUMENTS

2009/0240735 A1* 9/2009 Grandhi ................. G06Q 30/02
2015/0095228 A1* 4/2015 Su .......................... G06O 20/12
705/44
2018/0188919 A1* 7/2018 Yuan ..................... G06F 3/0416

OTHER PUBLICATIONS

NEC corporation of america; NEC showcasing integrated life-cycle management retail solution at NRF14 to empower today's retailers. (Jan. 22, 2014). Journal of Engineering Retrieved from https://search.proquest.com/docview/1477488280?accountid=14753.*

* cited by examiner

Primary Examiner — Kathleen Palavecino
(74) Attorney, Agent, or Firm — Haynes and Boone, LLP

(57) ABSTRACT

A system for identifying and providing user interface features based on a captured image wherein the system performs operations including capturing video frames, delineating an object within at least one of the video frames, determining identification information about the object; and augmenting the display of the object.

33 Claims, 8 Drawing Sheets

ITEM RECOGNITION AND INTERACTION

TECHNICAL FIELD

The present disclosure generally relates to detecting and classifying objects, and more specifically, providing a tailored interface for interacting with recognized objects.

BACKGROUND

Traditional shopping generally requires that a user browse and sift through merchant items at a brick and mortar store to find correct sizes, colors, styles, and prices. The individual may also have to take the item to a checkout stand for purchasing. This method of shopping is a bit antiquated and has several drawbacks. For example, the individual may not see all the possible selections for an item. An item may be difficult to locate in the store, such that the individual may spend an inordinate amount of time looking for the item. Certain items may be sold-out or held in a back room storage area unavailable to the individual. As a result, the in-store shopping experience for the consumer may be inefficient and frustrating. One or more of the embodiments disclosed below help address these difficulties along with providing other advantages.

Figure 1:
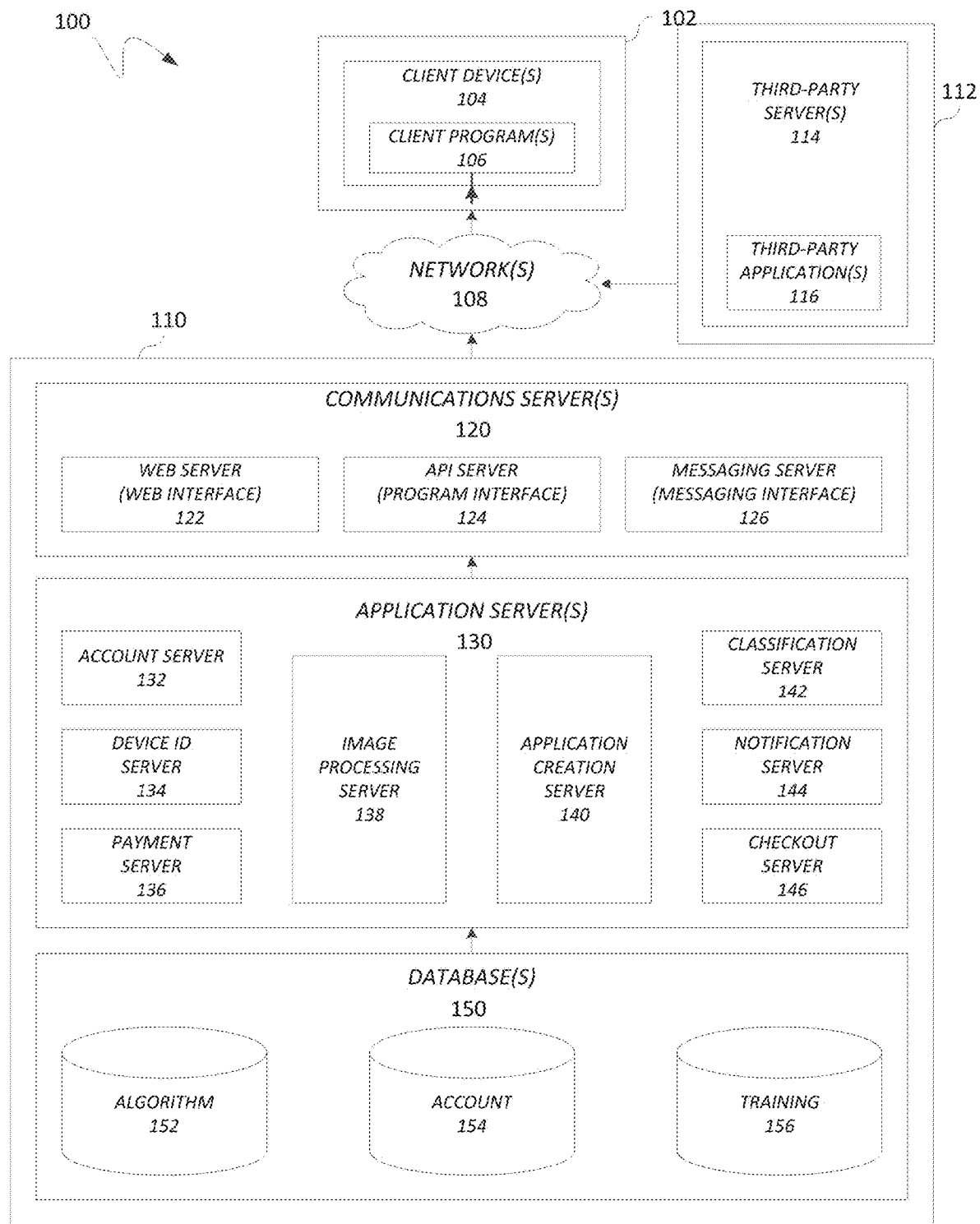
FIG. 1 is a block diagram of an exemplary computing system that is adapted for implementing a system for identifying merchant items.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

In some examples, a system and method for image processing, item recognition, and application creation and customization is provided. In some embodiments, the system customizes an application for use on a user device based on information provided by a merchant. This information may include inventory information, images of inventory, logos, and application interface customization information. The system may use the received images to create a customized application for users to download and install on a user device, such as a mobile phone. The application may be configured, when executed, to cause the user device to capture video or still images (generally referred to herein as digital content) using an image sensor. Note that, as described herein, video can include one or more still images. The captured digital content may be displayed on the user device as well as sent to a server handled by the system. The application and/or system may perform several image processing and classification algorithms on the digital content to determine whether anything within the digital content matches an item in the inventory of the merchant or otherwise available for purchase by the user. The application may be configured to provide an indication as to which items in the image are items for sale by the merchant. The digital content may be augmented such that a user may be able to directly interact with objects in the digital content while it is being displayed on the user device. In some examples, a shirt in the digital content may be dragged from the digital content to a checkout icon such that the user can purchase the item. In some examples, the application may also maintain a catalogue of all the items that the application and/or system recognized from the digital content capture with options to purchase the items.

In some examples, a system for enabling item recognition and digital content augmentation is provided. In some embodiments the system includes a non-transitory memory storing instructions and one or more hardware processors coupled to the non-transitory memory and configured to read the instructions from the non-transitory memory to cause the system to perform several operations. In some embodiments, the operations include receiving digital content captured by a device, distinguishing an object in the digital content, categorizing the object, and sending, to the device, information for an image overlay based on the object categorization.

In some examples, the system includes a non-transitory memory storing instructions and one or more hardware processors coupled to the non-transitory memory and configured to read the instructions from the non-transitory memory to cause the system to perform operations. In some examples, the operations include capturing video frames delineating an object within at least one of the video frames, sending the at least one video frames and an indication delineating the object to a server, receiving, from the server, information about the object, and displaying an overlay over the video based on the information about the object.

In some examples, the system includes a non-transitory memory storing instructions and one or more hardware processors coupled to the non-transitory memory and configured to read the instructions from the non-transitory memory to cause the system to perform operations. In some examples, the operations include receiving digital content from a device, distinguishing an object within the digital content, categorizing the object as a first item based on at least one training database, and causing an application on the device to display a catalog comprising the first item, including displaying a first image of the first item.

As such, this enables a user to walk through a store, capture items of interest, either through video or still images, view the digital content on the user device (such as a smart phone), make selections through a graphical user interface (GUI) on the user device of desired items contained in the digital content, receive information about the selected items, and make a purchase of items, all through the user device while at the physical store of the merchant.

FIG. 1 illustrates, in block diagram format, an exemplary embodiment of a computing system adapted for implementing a system for merchant item identification. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party servers 114 hosting third-party applications 116. In various implementations, third-party servers 114 and/or third-party applications 116 may host applications associated with or employed by a third party 112. For example, third-party servers 114 and/or third-party applications 116 may enable network-based system 110 to provide client 102 and/or system 110 with additional services and/or information, such as merchant information, data communications, payment services, security functions, customer support, and/or other services, some of which will be discussed in greater detail below. Third-party servers 114 and/or third-party applications 116 may also provide system 110 and/or client 102 with other information and/or services, such as email services and/or information, property transfer and/or handling, purchase services and/or information, and/or other online services and/or information.

In one embodiment, third-party servers 114 may include an email server that hosts a user's email account. In some embodiments, the third-party servers may include a merchandise database that can provide information regarding different items and/or products for sale. In yet another embodiment, third-party severs 114 may include one or more servers for aggregating user data, purchase data, and other statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account management, object recognition, image processing, monetary transfers, item recognition, checkout processing, data gathering, data analysis, and other services to users that access network-based system 110. In various embodiments, client devices 104 and/or third-party servers 114 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party servers 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various services to clients including, but not limited to, image recognition, object recognition, machine learning, checkout processing, and/or the like. Application server 130 of network-based system 110 may provide services to a third party merchants such as application creation and customization, payment processing, and/or the like. Application servers 130 may include an account server 132, device identification server 134, payment server 136, image processing server 138, application creation server 140, classification server 142, notification server 144, and/or checkout server 146. These servers, which may be in addition to other servers, may be structured and arranged to configure the system for identifying merchant objects based on images received and provide purchasing services for the merchant objects.

Application servers 130, in turn, may be coupled to and capable of accessing one or more databases 150 including a classification algorithm database 152, an account database 154, and/or training database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
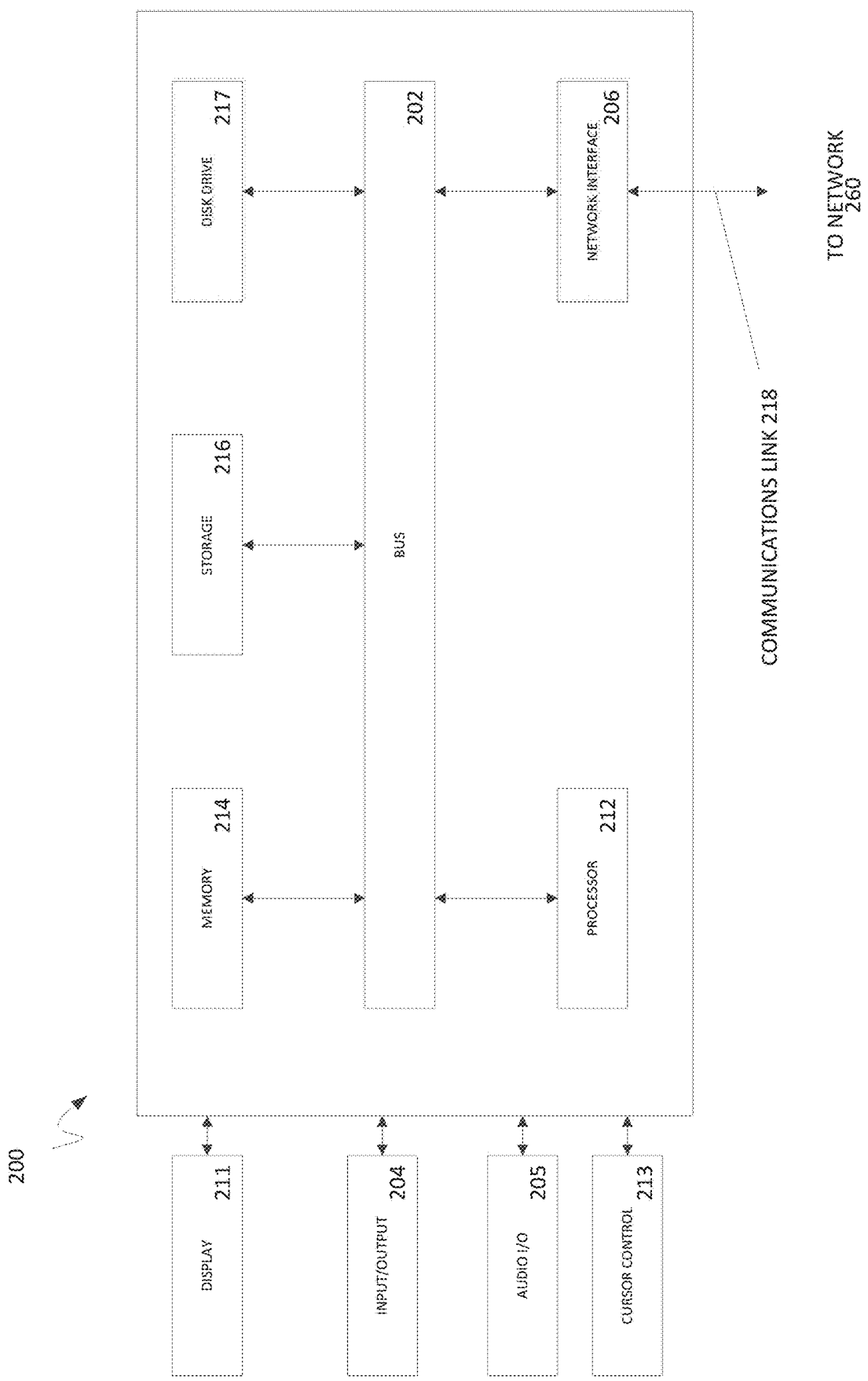
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touch screen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
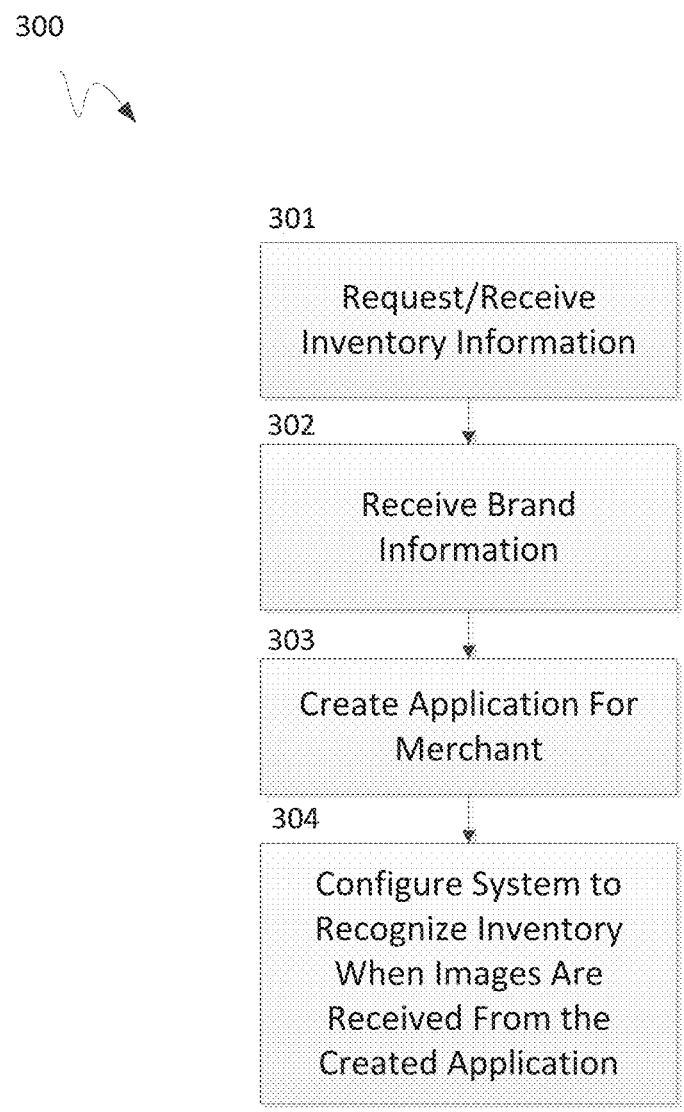
FIG. 3 is a flow diagram illustrating an exemplary customized application creation process.

FIG. 3 illustrates exemplary white-label application implementation process 300 that may be implemented by a system for creating an item recognition application tailored to a particular merchant. Process 300 may be implemented on a system such as system 100 of FIG. 1 according to some embodiments. According to some embodiments, process 300 may include one or more of operations 301-304, which may be implemented, at least in part, in the form of executable code stored on a non-transitory, tangible, machine readable media that, when run on one or more processors, may cause a system to perform one or more of the operations 301-304.

At operation 301, the system may request and/or receive inventory information from a merchant. In some examples, the system may request that the inventory information be provided in one or more particular formats and/or using certain database platforms. In this manner, the system may easily parse the inventory information for use with an item identification system and/or for training an item identification algorithm. Some exemplary databases may include, but are not limited to, SQL® and MySQL®. In some examples, the system may recognize the merchandise data formats and may have a converter to convert incompatible data formats to a compatible data format. In some examples, the inventory information may be uploaded/downloaded over a network, such as network 108 of FIG. 1.

Inventory information may include, but is not limited to, product names, product identifiers, universal product codes (UPC), product images, three dimensional (3D) renderings, product descriptions, product specifications, product accessories, product options, and/or the like. In some examples, the system may store the received information in a database or partition of a database dedicated to this particular merchant. In some examples, the database and/or partition may have a unique address and/or identifier associated with the merchant. In this manner, merchant information for one merchant may be distinguished from merchant information for other merchants.

At operation 302, the system may receive branding information from the merchant. This branding information may be used by the system to apply branding to the created application. Branding information may include, but is not limited to, brand images, the brand name, color schemes, and/or the like. Similar to the inventory information, the information received at operation 302 may be stored in a separate database associated with the merchant.

At operation 303, the system may create an application, using one or more of the information received at operation 301 and/or 302, which is tailored to the merchant. In some examples, the application may be an application for a mobile device and/or one or mobile operating systems, such as iOS® and/or Android®. In some examples, the application may be configured to capture data using an image sensor of the device that the application is installed on and cause the device to send the image sensor data to the server with information identifying the application. In some examples, the system may cause the application to connect and send the captured data through an API of the system. In some examples, the captured data may be provided as video frames and/or a video file. In other embodiments, the captured data may be one or more still images. Generally, the capture data may be referred to herein as digital content. The system may use the received data to identify products for the merchant, as discussed in more detail below. The system may interact with the application such that the application displays and provides functionality for identifying and purchasing the identified products from the merchant, which is discussed in more detail below.

In some examples, the application may be a general off-the-shelf product and the system may customize the program with the information received at operations 301 and 302. In some examples, the system may provide to the merchant a template as part of an application builder, and the merchant may customize the application by adding in backgrounds, logos and other customizations. However, the core functionality of the application may be preset with predetermined API settings for connecting with the system. Additionally, the system may set up identifiers to distinguish applications tailored to one merchant from applications tailored to another merchant. The system, at the backend, may use the identifier to manage application functionalities, APIs, and connections/access to different databases. This application may be made public on an application marketplace or on a webserver for downloading and/or installation.

At operation 304, the system may be configured to receive images from devices that use the application created in operation 303. For example, the application may communicate images to the system through an API. The system may be configured to identify which merchant that the application is associated with based on an identifier that a device provides through the application and/or the API that the application uses. As discussed above in operation 303, the application may cause the device to send image sensor data to the system; the system in response may be configured to identify merchant products in the image using the database of information received in operation 301. The system may respond to the device with item information based on which merchant products are identified in the image in addition to causing the application on the device to perform certain functions as discussed in more detail below.

Figure 4:
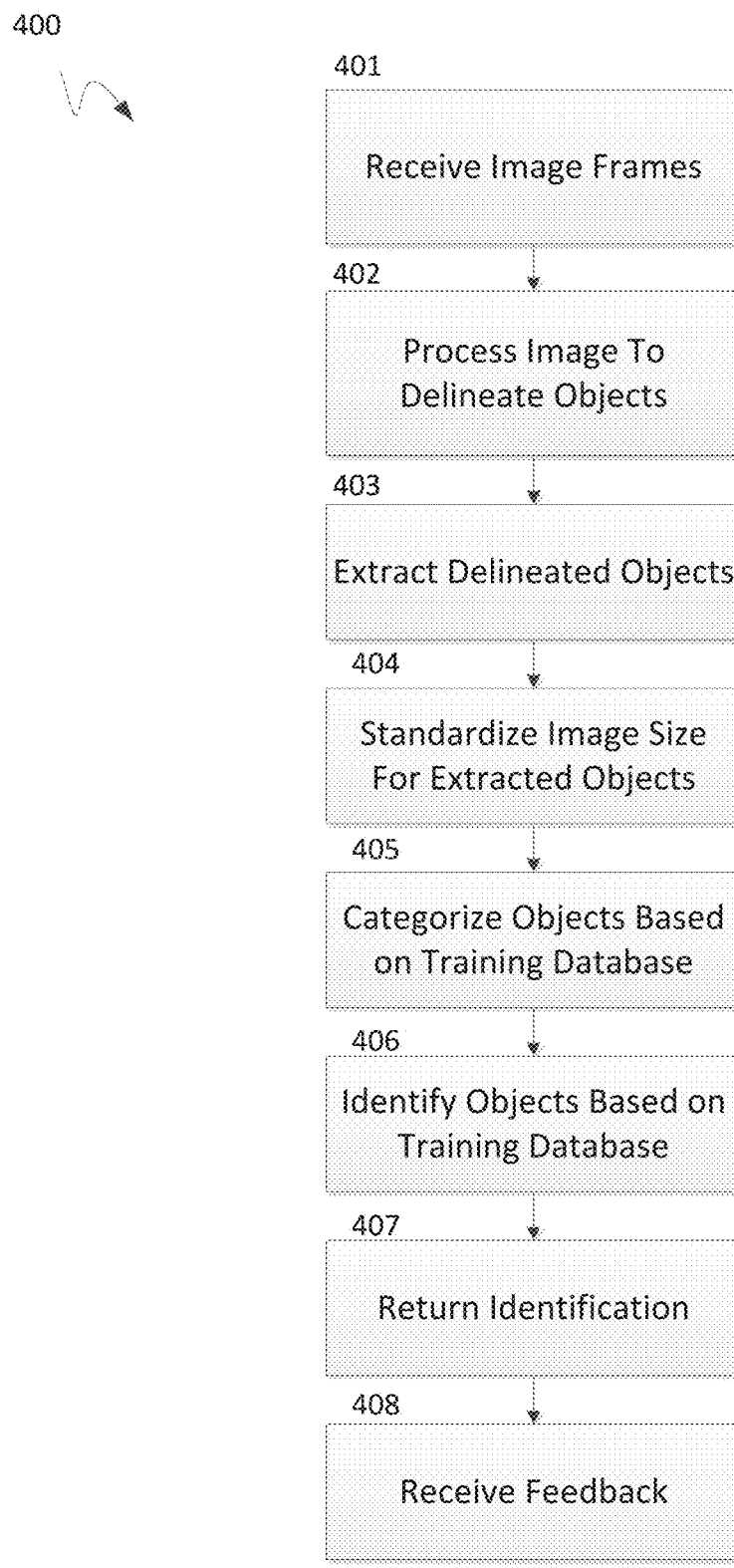
FIG. 4 is a flow diagram illustrating an exemplary process for identifying merchant items in an image.

FIG. 4 illustrates exemplary process 400 that may be implemented by a system to identify merchant items in images or digital content that it receives. In some examples, the images may be part of a video capture. Process 400 may be implemented on a system such as system 100 of FIG. 1 according to some embodiments. According to some embodiments, process 400 may include one or more of operations 401-408, which may be implemented, at least in part, in the form of executable code stored on a non-transitory, tangible, machine readable media that, when run on one or more hardware processors, may cause a system to perform one or more of the operations 401-408.

At operation 401, the system may receive one or more images. In some examples, the images may be part of a video file and/or may be frames of recorded video, while in other embodiments, the images may be one or more still images. In some examples, the images may be received from an application as discussed in operation 304 of FIG. 3. The images received may be part of a streaming video or series of still images that a device is communicating to the server in real time. The device may be running an application that connects to the system through an API and provides the images through the API along with other information. Other information may include device identifiers, user information, application identifiers, network addresses and/or the like. The system may use the other information to distinguish connections, requests, and responses from different devices.

At operation 402, the system may process the images to delineate different objects within the images. For examples, the system may implement edge detection and/or blob detection algorithms to delineate different objects within an image. In this manner, objects within the image may be distinguished from each other. In some examples, additional image processing may be conducted on the image such that features can more easily be extracted from the image. For example, the system may implement one or more normalization algorithms on the image, such as contrast normalization.

In some examples, the image processing may be implemented on an image from a single video frame from a set of frames. In some examples, the image processing may be implemented on a select group of video frames rather than all video frames received. In this manner, the amount of processing the system conducts is reduced, thereby saving computing power. In some examples, the frames that the system chooses to process may be determined based on how blurry or sharp an image is. The blurriness of an image may be determined by transforming the image into the frequency domain and determining whether the transform contains high frequencies associated with sharp images. The system may then select the sharpest frame from a set of frames. In some examples, the system may take the sharpest frame within a threshold number of consecutive frames, such as one frame out of every sixty consecutive frames. In some examples, the threshold number may be for a time frame, such as one frame every second.

In some examples, instead of the system conducting the image processing, another device, such as the image capturing device, may process the image and provide the processing results to the system. In such an example, operation 402 may be skipped. In some examples, some of the image processing may be split between the capturing device and the system.

At operation 403, the system may separate or extract each delineated object from the image and create copies for applying one or more image recognition algorithms. In some examples, extracting a delineated object from an image may be extracting or copying pixels within and/or associated with an edge determined through an edge detection algorithm and/or a blob through a blob detection algorithm on the original image.

In some examples, when the image is processed to identify objects, some objects may be wholly encompassed within another object. In such an example, the system may extract the larger object with the objects encompassed within it to make one image, extract the smaller objects to create another image, and extract the larger image without the smaller objects to create yet another image. In this manner, the smaller objects can be used by the system during item recognition as an identifying feature of the larger object. Additionally, if the smaller object is its own separate object, the system may be able to also identify the object alone. Finally, extracting the smaller object from the larger object may help the system recognize the larger object when the smaller object is not part of the larger object. As an example, buttons on an image of a shirt would help identify a shirt, but cufflinks on a shirt would not. In both of those cases, the edges and/or blob delineating the smaller object (i.e. the buttons and cufflinks) would likely be encompassed by the edges and/or blob delineating the larger object (i.e. the shirt) in an image.

At operation 404, each separate image of each extracted object may be standardized to a particular image size, such as a 25×25 pixel standardized image template. In some examples, the standardized image size may be larger or smaller. When the image of the extracted object is larger than the standardized image size (e.g., the extracted image has a row and/or column of pixels that extends beyond the standardized image size), the system may shrink the image to fit the standardized image size. In some examples, the system may shrink the image using one or more image resizing algorithms such as bilinear sampling, nearest neighbor, bicubic interpolation, and/or the like. In some examples, the image may be cropped or warped to fit the standard image template.

In contrast, when the extracted image is smaller than the standard image, the extracted image may be centered in the new standardized image with the excess pixels set to white, black, and/or another color. In some examples, the image may be stretch and/or scaled to fit the standard image template.

In some examples, the image may be centered by placing one of the center pixels of the extracted image on one of the centered pixels of a standard image template. The center of the extracted image may be determined by a center of gravity calculation algorithm for the image. In some examples, the image may be scaled to fit the standard image size using one or more image scaling algorithms. In some examples, a standardized picture size may not be used, and instead the raw image and image size may be used. This may be the case when the categorization algorithm implements spatial pyramid pooling or other algorithms that mitigate the need for fixed image sizes.

At operation 405, the system may categorize each object individually for an object type. An object type may be a generalized category for certain objects, such as a shirt, blouse, pants, shoe, hat, etc. The categories may expand beyond articles of clothing. The system may categorize the objects using one or more classifiers, such as one or more of restricted Boltzmann machine, multilayer perceptron, autoencoder, deep learning, convolution neural network, and/or the like. The classifier may be trained to detect the object using a training database for supervised and/or unsupervised learning. A more detailed discussion on an exemplary classifier is provided below. The categorization of the object may be used to narrow down the number of additional classifiers used to identify the exact item that is in the image. Identifying an article of clothing may use multiple classifiers which may be computationally intensive. As such, implementing a hierarchy of classifiers wherein resource intensive classifiers are used last will increase efficiency. For example, identifying whether an object is a shirt is much less resource intensive than identifying whether the shirt is a particular shirt made by a particular manufacturer.

At operation 406, based on the categorization of the object in operation 405, the system may select a plurality of item classifiers to determine if the object matches an item from the merchant. For example, the system, after determining that the object is a shirt, may determine which merchant items are also categorized as shirts. The system may determine which classifiers are associated with each of the merchant items and use the classification algorithms to determine which item from the merchant, if any, matches the image. A more detailed discussion of the item classifiers follows below.

At operation 407, the system may return or send information about the identified object to the device that sent the images. In some examples, the information may include some of the information received from the merchant in operation 301 of FIG. 3. For example, the system may provide stock images of the item from the merchant. In this manner, the user may be able to quickly identify whether the identified object is the same object that the user captured an image of. Additionally, the system may provide price, check out options, item names, item specifications, and/or the like. In some examples, the system may provide information regarding the availability of the items at different merchant locations. In some examples, the information may include an indication as to which items and item options are available at a merchant location that a user device is located at based on location information received from the user device.

In some examples, the system may respond with item availability information in response to a user providing particular items and item preferences to the system. In this manner, the use device does not have to store all of the merchandise information locally on the device memory.

Additionally, the system may send a unique or semi-unique identifying feature of the object for the user device to be able to recognize the object quickly. For example, the system may identify a color, pattern, connected objects, and/or the like associated with the object. In this manner, the user device can rapidly identify the object, rather than having the device conduct resource intensive image processing, and provide an interactive live streaming video feed.

At operation 408, the system may request and receive feedback with regards to how accurate the system was in identifying an object. The system may request feedback on whether operation 405 correctly categorized the object and/or whether operation 406 correctly identified the merchant item. The response may be used to update the training database of each classifier. For example, the system may determine which images were used to categorize and identify the merchant item, and label those images based on the received feedback (e.g. correct or incorrect). Furthermore, the feedback may be used to update a classifier through back propagation. In this manner, the classifier of the system improves over time.

Figure 5:
FIG. 5 is a flow diagram illustrating an exemplary process for categorizing objects in an image.

FIG. 5 illustrates exemplary process 500 for categorizing objects in an image. Process 500 may be implemented on a system such as system 100 of FIG. 1 according to some embodiments. According to some embodiments, process 500 may include one or more of operations 501-504, which may be implemented, at least in part, in the form of executable code stored on a non-transitory, tangible, machine readable media that, when run on one or more hardware processors, may cause a system to perform one or more of the operations 501-504.

At operation 501, the system may receive and/or retrieve images from a training database for training a classifier, such as k-means, neural network, Bayes classifier, and/or the like. In some examples, the system may use a combination of classifiers, and the system may train one or more of the classifiers using the training database.

In some examples, the system may have a different training database associated with different categories (e.g., one for each category of shoes, pants, blouses, shorts, socks, hats, t-shirts, button shirts, coats, etc.). In some examples, the training database may contain labeled data for training the classifier to determine whether objects in an image belong to a particular category. For example, the training database may have several different images of shirts (or another object) in different orientations labeled as containing shirts (or another object). Additionally, the training database may be several different images that do not contain shirts (or another object) with an indicator that those images do not have shirts (or another object). In some examples, the training database may be regularly updated from user feedback as discussed above. The classifier may receive the images from the training database as inputs, and output whether the algorithm recognized the existence of an object within the category. The system may then compare the output with the known label to determine whether the algorithm was correct or incorrect. The result may be used to adjust the classifier, such as conducting backwards propagation on a neural network. In some examples, the system may use the information from the training database to cluster objects, such as k-means, and use the mean values for categorizing objects. In such a case, rather than conducting back propagation, each new data point provided in the database will update the mean values of the classification algorithm.

In some examples, the categorization algorithm may be augmented to detect certain features that are indicative of an object, such as a certain shape. In some examples, the features may be determined from neurons in the hidden layer of an autoencoder. In some examples, images may be provided to an autoencoder and one or more neurons in the autoencoder that are best at accurately classifying for the object may be used to augment the trained categorization algorithm. For examples, image pixels may be input into both the trained categorization algorithm and the autoencoder, and results from a select plurality of neurons from the hidden layer of the autoencoder (neurons that most accurately correctly recognize the object) may be also fed as input into the trained categorization algorithm. In some examples, a weighted value may be provided to the results from the autoencoder and the trained categorization algorithm, and the system may combine the results to categorize an object.

At operation 502, the system may receive an image to categorize. The image received may be an object image extracted in operation 403 of FIG. 4 and/or the standardized image of the extracted object in operation 404 of FIG. 4. The system may input the received image into the trained classifier of process 501 and determine whether the classifier classifies the object under one or more categories. The results from the classifier may be sent to the system and/or device requesting the categorization of the object. The results may provide which categories, if any, the classifier determines for the object. In some examples, the results may be Boolean true/false results. In some examples, the results may have a weight and/or confidence number, such as a fraction of one. In some examples, the system may provide multiple categories. In some examples, when multiple classifiers classify the object for different categories, the system may pick which category to respond with based on a confidence value provided by the classifiers.

At operation 503, the system may receive feedback regarding whether the classifications were correct or incorrect. In some examples, the feedback may be the feedback obtained in operation 408 of FIG. 4. Based on the feedback, the system may update its classifier through back propagation and/or adding the associated image in the training database for retraining the classifier with the correct label—the label being based on the feedback.

Figure 6:
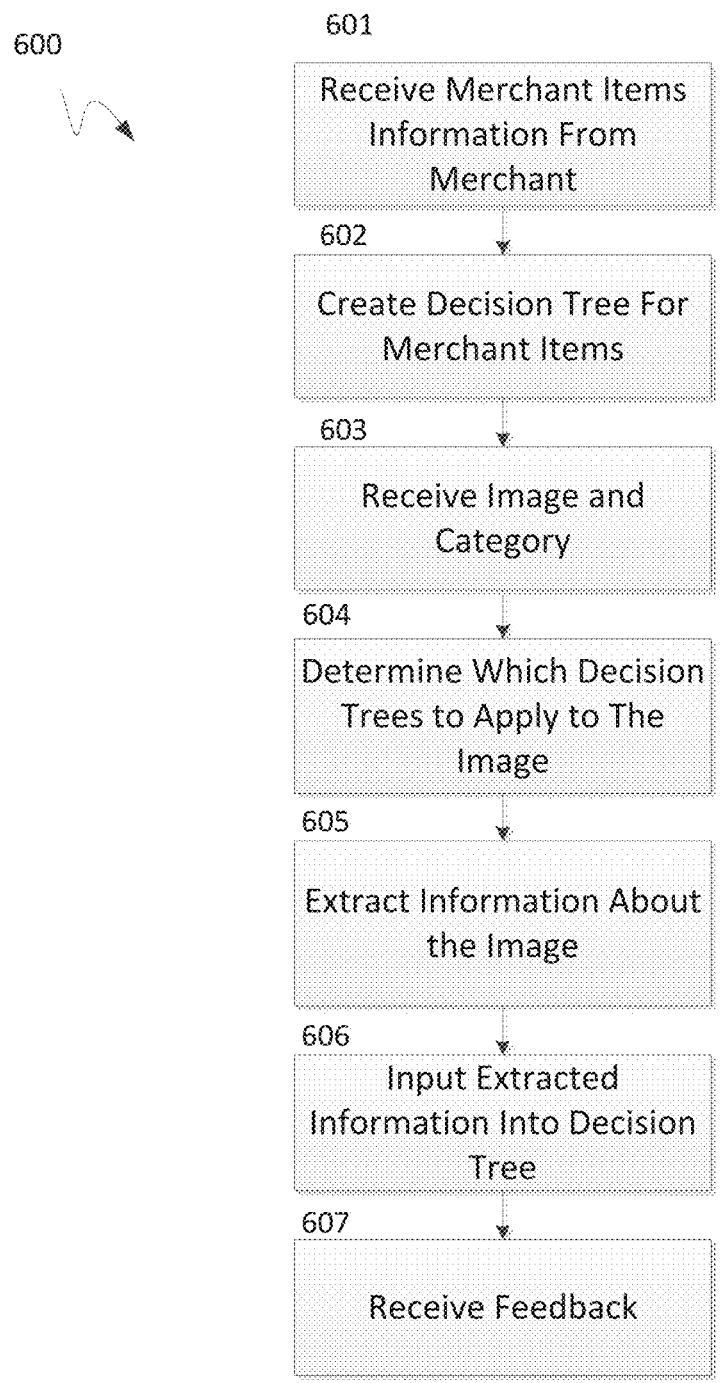
FIG. 6 is a flow diagram illustrating an exemplary process for identifying items in an image that has been categorized.

FIG. 6 illustrates exemplary process 600 for identifying a merchant item in an image. Process 600 may be implemented on a system such as system 100 of FIG. 1 according to some embodiments. According to some embodiments, process 600 may include one or more of operations 601-607, which may be implemented, at least in part, in the form of executable code stored on a non-transitory, tangible, machine readable media that, when run on one or more hardware processors, may cause a system to perform one or more of the operations 601-607.

At operation 601, the system may receive merchandise information from a merchant. In some examples, the merchandise information may be the inventory information received at operation 301 of FIG. 3. The merchandise information may include product names, product identifiers, universal product codes (UPC), product images, three dimensional renderings, colors, sizes, product categories, material, and/or the like.

At operation 602, the system may create a decision tree for each product to help identify the merchant item from a received image and a received object categorization. In some examples, the categorization may be the categorization discussed with FIG. 5 above. For example, the merchant item may come in certain color combinations and the decision tree may check to see whether the image of the object matches one or more of those colors. Additionally, the system may identify other characteristics of the item, such as printed patterns, logos, styling (e.g., cuffs, pleats, collar styling, lapel styling, buttons, etc.), and/or the like. In some examples, the system may implement one or more classifiers to identify characteristics from the image to compare with item information from the merchant. The decision tree may be configured to check for characteristics that require a lot of computer resources last. For example, matching colors and patterns may use fewer resources than checking for cuffs or collars.

In some examples, the decision tree may be used to filter out items that do not match the filter. For example, if the object in the image is blue, the system can determine that the object is not an item from the merchant which does not have the color blue. Similarly, if the system determines that the object has a herringbone pattern, the system can eliminate merchant items that do not come with a herringbone pattern.

In some embodiments, the system may train a classifier to identify a particular merchant item similar to how categorization is conducted as discussed in FIG. 6. For example, the images and three dimensional renderings received from the merchant may be used as part of a training database to train a classifier to identify the merchant item. In some examples, the system may convert three dimensional renderings into a form that the classifier can be trained with. For example, the system may convert the three dimensional renderings into multiple two dimensional images from many different perspectives. Furthermore, the system may separate the three dimensional rendering into separate pieces and create two dimensional images from the separate pieces for use in training a classifier for the associated merchant item.

At operation 603, the system may receive an object image and object categorization. In some examples the object image may be the extracted image at operation 502 of FIG. 5 and the object categorization may be the categorization determined in operation 503 of FIG. 5.

At operation 604, the system may determine which decision trees created at operation 602 are used to analyze the object image. In some embodiments, the determination may be based on the object categorization. In some examples, the system may compare the received object categorization with item categorizations received from the merchant at operation 601. The system may filter out the decision trees that are not for the same category as the category received in operation 603. In this manner, the system can reduce the number of decision trees and classifiers used to identify the object. Classifying an object using neural networks and other trained algorithms may be computationally intensive, thus reducing the number of trained algorithms will increase the speed and efficiency of the system when identifying a merchant item that matches the object within the image.

At operation 605, the system may analyze the image for information to input in the decision trees determined at operation 604. For example, the system may identify the different colors associated with the object in the image and determine which merchant items have matching or similar colors. In some embodiments, the system may group different shades of a color together. The system is more likely to correctly match items even though the image may be captured with less than ideal lighting, contrast, white balance, and/or the like. In some examples, the system may normalize contrast of the image to increase accuracy.

In some examples, the system may detect text within the image using optical character recognition to determine whether there are logos or text matching text and/or logos of a merchant item. In some examples, the system may sample and/or detect recurring patterns in the image to determine which items contain matching patterns. In some examples, the system may be configured to identify common patterns, such as herringbone, windowpane, houndstooth, pinstripes, bird's eye, plaid, checkered, sharkskin, and/or the like.

At operation 606, the system may input the image into one or more trained classifiers from operation 602 for the remaining items that are not eliminated at operation 605. As discussed above, each of the classifiers may be configured to identify a different merchant item. The system may return, in response to the object image receive in operation 603, the items that were positively identified by the classifiers in this operation. In some examples, the system may also return other information with regards to the merchant item. In some examples, the system may provide and/or link to information regarding pricing, item names, purchase options, item specifications, stock images, and/or the like associated with the identified item. In some examples, this information may be the information received at operation 601.

In some embodiments, the system may also return simple identifying characteristics of the item such that a less powerful image processor, such as one on a user device, may be able to quickly identify the item in other images. For example, the system may respond with the exact color code of the identified item in the image received at operation 603. In this manner, a user device may be able to quickly identify the object in other images that the device captures. In some examples, the system may respond with patterns that identify the object. Feature or item extraction/determination may be used in conjunction with location information, such as knowing what type of items are available or generally available at the location and filtering out images of items that are not likely to be at the location, even though an algorithm may identify an image as a certain item. As such, computing power may be reduced because item determination may be limited to only what is expected at a particular location the user is at.

At operation 607, the system may receive feedback as to which identifications were correct or incorrect. In response, the system may update the classifiers and/or training databases used at operation 606.

Figure 7:
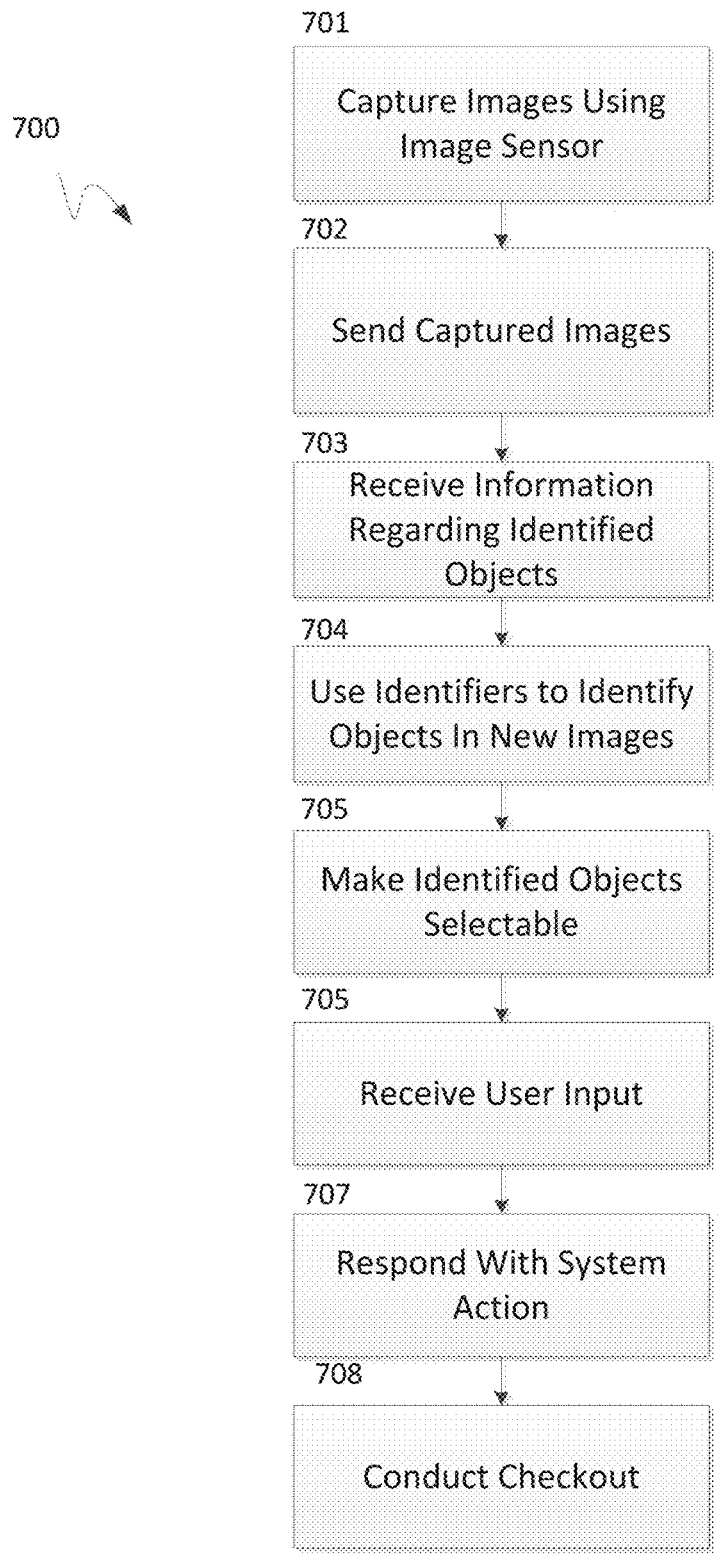
FIG. 7 is a flow diagram illustrating an exemplary interface for identifying items.

FIG. 7 illustrates exemplary process 700 for a system and interface for identifying merchant items. Process 700 may be implemented on a system such as a user device and/or system 100 of FIG. 1. According to some embodiments, process 700 may include one or more of operations 701-708, which may be implemented, at least in part, in the form of executable code stored on a non-transitory, tangible, machine readable media that, when run on one or more hardware processors, may cause a system to perform one or more of the operations 701-708. In some embodiments, process 700 may be operations of an application that is installed on a user device.

At operation 701, the system may capture images using an image sensor. In some examples, the image sensor may be on a user device, such as a smart phone or other device. In some examples, the system may capture video using the image sensor. In some examples, the images and/or video captured by the image sensor may be displayed on a display of the system. In some examples, the images and/or video displayed may be in real time and/or near real time. In some examples, the system may be configured to delay the display of the images and/or video on the device. In some examples, the delay may be introduced such that the system may provide an augmented reality object on top of the displayed video and/or images.

At operation 702, the system may send, over a network, the images captured by the image sensor to a server for identifying items within the images. In some examples the server may be running one or more systems such as the systems discussed in FIGS. 3-6.

At operation 703, the system may receive information regarding items identified in the images sent to the server in operation 702. In some examples, the system may receive identifying information for identifying the items captured by the image sensor. For example, the system may receive a color, a pattern, and/or the like associated with the item. Furthermore, the system may receive other information regarding the objects identified in the images sent in operation 702. For example, the system may receive pricing information, links to merchants for purchasing the identified objects, stock images, and/or the like.

In some examples, the system may create a catalogue of the objects identified at operation 703. The catalogue may display a stock image of the identified item and the image and/or image frame that was used to identify the item. In this manner, a user may be able to determine whether the item in the image captured by the user device was correctly identified and/or whether a certain item the user was interested in was identified or not.

The catalogue may also provide links and/or check out options to purchase the identified item. The catalogue may allow the user to choose from optional designs for the item, such as different colors, sizes, patterns, and/or the like. Other information about the items may also be shown within the catalogue, such as price, product number, product name, availability, and/or the like. In some examples, the system may provide options to purchase the items from the merchant and have the item shipped. The system may be linked with a particular payment provider such that the user can purchase the item through the application.

At operation 704, the system, using object identifiers received at operation 703, identifies objects within newly captured images. For example, the identifier may be a color, and the system may determine which objects have the same color or a color within a certain threshold value. Colors may be represented in different manners and the threshold value may be a vector magnitude representing the difference between two colors. For example, colors may be represented by red, green, blue, and intensity for each color. Each color may be a point represented by each color and respective intensity, and the vector magnitude may represent a distance between two color points. In some examples, the system may use one or more other methods of identifying how close colors are to each other, which may depend on the method in which the system defines colors in an image.

In some embodiments, the system may detect colors in an image and determine how close those colors are to the color identifier. Pixels of the image that have colors within the threshold vector magnitude may be used to identify objects within newly captured images.

In some examples, the system may conduct edge and/or blob detection on each image to delineate different objects. The system may then identify whether the object has an identifier received at operation 703, such as a pattern or other identifier.

At operation 705, the system may display newly captured images on a display of the system with the objects in the images that are identified in operation 704 as selectable and/or actuatable elements. For example, the system may cause the location of the pixels that have colors that are determined to be within a threshold vector magnitude in operation 704 as selectable and/or actuatable elements. In some examples, the images may be part of a video stream, such that a new image may be rapidly being displayed and the location of the selectable elements may change as the images and video frames change. In some examples, the system may cause objects delineated through edge and/or blob detection that have also been identified in operation 704 to be selectable. The location of the pixels displaying the object on the system display may be configured to be selectable and/or actuatable elements.

In some examples, the system may also display an overlay of information near, on, within a threshold distance, and/or around the identified object. The information may include information about the object received at operation 703. For example, the system may display pricing information, product identifiers, product number, product name, color options, and/or the like. This information may also be used as an indicator to indicate that an object is selectable. In some examples, a highlight or other indicator may be displayed as an overlay indicating which objects are selectable. In some examples, edges detected using edge detection and/or blob detection may be highlighted and/or bolded.

At operation 706, the system may receive a user input selecting and/or actuating one of the selectable and/or actuatable elements of operation 705. For example, the system may receive a touch input from a touch screen of the system located where the actuatable elements of operation 705 are located.

At operation 707, in response to receiving the user input at operation 706, the system may respond with one or more actions. In some examples the actions may include a user interface action indicating that an item is selected. In some examples, the indication may be a highlight or a change of color on the display, such as a change of color for one of the overlays discussed in operation 705. In some example, in response to a click and drag input, the system may display an overlay of the object selected. The system may make a semitransparent image copy of the object selected. The image copy may be a copy from the video frame at the time of the selection which may be delineated by blob detection, edge detection, and/or pixel colors. The user may be able to drag and drop the copied image to a check out box for purchase and/or more information. In some examples, the action may be to put the associated identified merchant item in a checkout box. In some examples, the action may be to display more information about the item, such as stock photos, checkout information, and/or checkout options.

At operation 708, the system may receive a checkout request and respond with a checkout procedure. The checkout procedure may include providing a user interface for the user to select which items to purchase, select sizing options, select color options, select payment options, read reviews, ask questions, provide a review, provide shipping options, pickup options, and/or the like. In some examples, the system may check wither a merchant server to determine whether one or more of the items with the one or more user preferences, e.g. size, color, etc., is available at one or more merchant locations. In some examples, one of the one or more merchant locations may be at a merchant location that the user is currently located at or within a threshold distance. In this manner, the use may be able to purchase the item at a physical merchant if available.

In some examples, in response to a checkout request, the system may send to a server a request to purchase one or more items based on the user selected options. The checkout request may include authentication information for a payment method to conduct a payment. In some examples, the system may provide confirmation when confirmation is received from the server.

Figure 8:
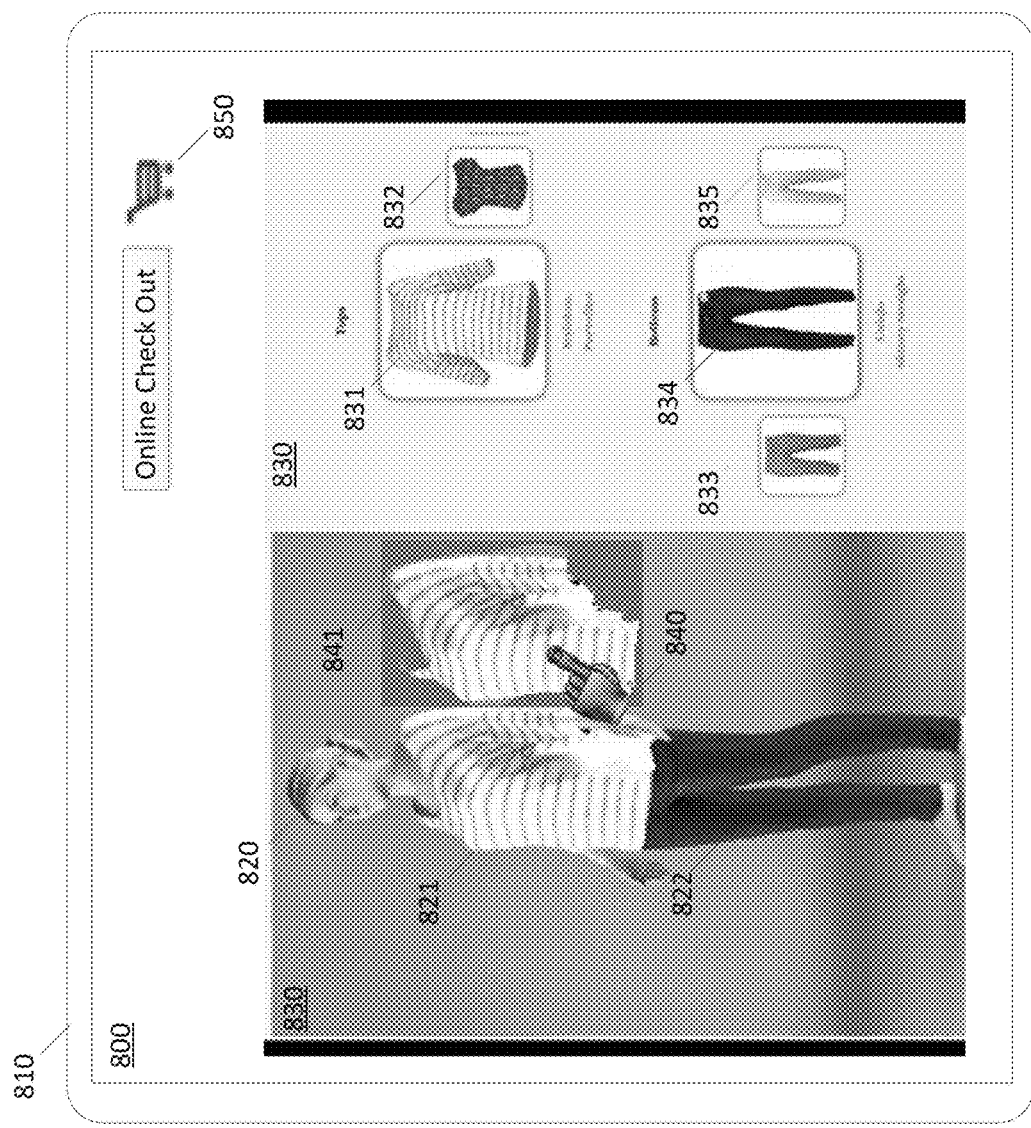
FIG. 8 illustrates an exemplary user interface.

FIG. 8 illustrates an exemplary implementation of some of the user interface features discussed in FIG. 7. In this example, interface 800 is displayed on a user device 810. In some examples, user device 810 may be one of the client devices 104 of FIG. 1 and/or the computer system in FIG. 2.

A shown, interface 800 may display a video and/or image that has recently been captured by an image sensor (not shown) of device 810. In this example the user device is capturing an image/video of a person 820 and displaying it on a display of user device 810 as video 830. As can be seen in video 830, person 820 is wearing items 821 and 822. In some examples, video 830 may be streaming video of live capture from the image sensor of user device 810. In some examples, video 830 may be a delayed video capture from the image sensor. In some examples, the delay may be predetermined.

User device 810, having identified items 821 and 822, may provide catalogue 830 of identified items 821 and 822. In some examples, items 821 and 822 may be identified in a manner similar to the identification operations discussed above. In some embodiments, catalogue 830 may provide selectable icons 831-835 for identified items 821 and 822 with optional patterns and/or colors that a merchant offers for items 821 and 822.

In this particular example, interface 800 is showing an action in response to a user conducting a select and drag input to user device 810. The user may have selected item 821 by pressing on a touch screen of user device 810 using finger 840. The user may have also, after selecting item 821, performed a drag motion. In response to the drag motion, interface 830 may display an overlay 841 that is a copy of the selected item from the video. The copy in overlay 841 may be in the shape of or a copy of the object, such as item 821, being displayed at the time (or within a predetermined time) of the selection or drag user input. The user may be able to drag overlay 841 to the checkout icon 850 to indicate a desire to purchase item 821 from a merchant.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing instructions; and
one or more hardware processors coupled to the non-transitory memory and configured to read the instructions from the non-transitory memory to cause the system to perform operations comprising:

receiving digital content captured by a device of a user at a merchant location;

identifying an object in the digital content based on a training database;

determining preferences of the user for characteristics of the object;

identifying the object having at least one of the preferences is available for purchase at the merchant location within a threshold distance;

sending, to the device, information corresponding to the object having at least one of the preferences that causes an image of the object to be displayed on the device;

receiving an indication whether the identifying the object in the digital content was correct; and in response to receiving the indication, updating the training database.

2. The system of claim 1, wherein the information comprises an identifier for the object.

3. The system of claim 1, wherein the operations further comprise sending to the device an image overlay associated with the object that causes the image overlay to be displayed with the digital content.

4. The system of claim 3, wherein the image overlay comprises a price for the object.

5. The system of claim 1, wherein the operations further comprise receiving image data associated with an image from a merchant and updating the training database with the image.

6. The system of claim 1, wherein the digital content is video content.

7. The system of claim 1, wherein the training database is one of a plurality of training databases based on a classification of the object.

8. A method, comprising:

receiving digital content captured by a device of a user at a merchant location; identifying an object in the digital content based on a training database;

determining preferences of the user for characteristics of the object;

identifying the object having at least one of the preferences is available for purchase at the merchant location within a threshold distance;

sending, to the device, information corresponding to the object having at least one of the preferences that causes an image of the object to be displayed on the device;

receiving an indication whether the identifying the object in the digital content was correct; and in response to receiving the indication, updating the training database.

9. The method of claim 8, wherein the information comprises an identifier for the object.

10. The method of claim 8, further comprising sending to the device an image overlay associated with the object.

11. The method of claim 10, wherein the image overlay comprises a price for the object.

12. The method of claim 8, further comprising receiving image data corresponding to an image from a merchant and updating the training database with the image.

13. The method of claim 8, wherein the digital content is video content.

14. The method of claim 8, wherein the training database is one of a plurality of training databases based on a classification of the object.

15. A non-transitory machine-readable medium having stored thereon machine-readable instructions executable to cause a machine to perform operations comprising:

receiving digital content captured by a device of a user at a merchant location;

identifying an object in the digital content based on a training database;

determining preferences of the user for characteristics of the object;

identifying the object having at least one of the preferences is available for purchase at the merchant location within a threshold distance;

sending, to the device, information corresponding to the object having at least one of the preferences that causes an image of the object to be displayed on the device;

receiving an indication whether the determining the object in the digital content was correct; and in response to receiving the indication, updating a training database.

16. The non-transitory machine-readable medium of claim 15, wherein the information comprises an identifier for the object.

17. The non-transitory machine-readable medium of claim 15, wherein the operations further comprise sending to the device an image overlay associated with the object.

18. The non-transitory machine-readable medium of claim 15, wherein the operations further comprise receiving image data corresponding to an image from a merchant and updating the training database with the image.

19. The non-transitory machine-readable medium of claim 15, wherein the digital content is video content.

20. The non-transitory machine-readable medium of claim 15, wherein the training database is one of a plurality of training databases based on a classification of the object.

21. A system, comprising:

a non-transitory memory storing instructions; and one or more hardware processors coupled to the non-transitory memory and configured to read the instructions from the non-transitory memory to cause the system to perform operations comprising:

receiving, at a merchant location, captured digital content comprising a plurality of objects;

delineating a first object from the plurality of objects within the digital content based on a training database;

determining preferences of a user for characteristics of the first object;

identifying the object having at least one of the preferences is available for purchase at the merchant location within a threshold distance;

sending at least part of the digital content and data associated with delineating the first object to a server;

receiving, from the server, information about the first object;

displaying an overlay based on the information about the first object;

receiving an indication whether receiving information about the first object was correct; and in response to receiving the indication, updating the training database.

22. The system of claim 21, wherein the operations further comprise:

receiving a user input selecting and dragging the overlay; and in response to the user input, displaying a duplicate image of the first object.

23. The system of claim 22, wherein the duplicate image is obtained from the digital content.

24. The system of claim 22, wherein the operations further comprise:
  receiving a second user input releasing the overlay from the user input selecting and dragging the overlay; and
  in response the second user input, providing an option to purchase the first object.

25. The system of claim 21, wherein the overlay comprises a price for the first object.

26. The system of claim 21, wherein the overlay comprises a product identifier.

27. The system of claim 21, wherein the operations further comprise placing the first object in a catalog based on the information about the first object.

28. A method, comprising:
  receiving, at a merchant location, captured digital content comprising a plurality of objects;
  delineating a first object from the plurality of objects within the digital content based on a training database;
  determining preferences of the user for characteristics of the first object; identifying the object having at least one of the preferences is available for
  purchase at a merchant location within a threshold distance;
  sending at least part of the digital content and data associated with delineating the first object to a server;
  receiving, from the server, information about the first object; displaying an overlay based on the information about the first object;
  receiving an indication whether receiving information about the first object was correct; and
  in response to receiving the indication, updating the training database.

29. The method of claim 28, further comprising:
  receiving a user input selecting and dragging the overlay; and
  in response to the user input, displaying a duplicate image of the first object.

30. The method of claim 29, wherein the duplicate image is obtained from the digital content.

31. The method of claim 28, further comprising:
  receiving a second user input releasing the overlay from the user input selecting and dragging the overlay; and
  in response the second user input, providing an option to purchase the first object.

32. The method of claim 28, wherein the overlay comprises a price for the first object.

33. The method of claim 28 further comprising placing the first object in a catalog based on the information about the first object.

* * * * *